US010096296B2

(12) United States Patent
Strode

(10) Patent No.: US 10,096,296 B2
(45) Date of Patent: Oct. 9, 2018

(54) TEMPORALLY ADJUSTED APPLICATION WINDOW DROP SHADOWS

(71) Applicant: Red Hat, Inc., Raleigh, NC (US)

(72) Inventor: Ray Strode, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 417 days.

(21) Appl. No.: 14/079,337

(22) Filed: Nov. 13, 2013

(65) Prior Publication Data

US 2015/0135131 A1 May 14, 2015

(51) Int. Cl.
*G06F 3/048* (2013.01)
*G09G 5/00* (2006.01)

(52) U.S. Cl.
CPC ........... *G09G 5/00* (2013.01); *G09G 2340/14* (2013.01)

(58) Field of Classification Search
None
See application file for complete search history.

(56) References Cited

U.S. PATENT DOCUMENTS 7,898,542 B1 3/2011 Yu et al.
2003/0058241 A1* 3/2003 Hsu ........................ G06T 15/60 345/426
2005/0262448 A1* 11/2005 Vronay ................. G06F 3/0481 715/767
2008/0211813 A1* 9/2008 Jamwal ................... G06T 15/60 345/426
2009/0094557 A1 4/2009 Howard
2010/0079426 A1* 4/2010 Pance .................. G06T 11/001 345/207
2010/0201692 A1 8/2010 Niles et al.
2013/0135309 A1* 5/2013 King ....................... G06T 15/60 345/426
2013/0332843 A1* 12/2013 Boettcher ............. G06F 3/0481 715/744

FOREIGN PATENT DOCUMENTS

WO WO 2008053533 5/2008

OTHER PUBLICATIONS

Sketchup Knowledge Base "Enabling Shadows" Oct. 16, 2012, retrieved from http://support.google.com/sketchup/bin/answer.py?hl=en&answer=114937, 2 pages.

(Continued)

*Primary Examiner* — William C Trapanese
(74) *Attorney, Agent, or Firm* — Lowenstein Sandler LLP

(57) ABSTRACT

A method and system for determining a first local time of day for a user device, and determining a first value of a visual aspect of a drop shadow associated with an application window on the display based on of the first local time of day. The drop shadow is displayed in view of the first value, wherein the drop shadow provides a visual appearance that the application window is above a background. A second local time is determined, and a second value of the visual aspect of the drop shadow is determined, wherein the second value is in view of the second local time. The drop shadow is displayed in view of the second value of the aspect such that the drop shadow has a different visual appearance from the first local time to the second local time.

14 Claims, 8 Drawing Sheets

(56) References Cited

OTHER PUBLICATIONS

Ajnaware's Weblog, "Sun Seeker—Seeing the Light with Augmented Reality", Oct. 6, 2009, retrieved from http://ajnaware.wordpress.com/2009/10/06/sun-seeker-seeing-the-light-with-augmented-reality/, 22 pages.
SUWiki, "Shadow Settings", Apr. 12, 2012, retrieved from https://sites.google.com/site/sagesuwiki/terminology/glossary/s/shadow-settings, 5 pages.
Rivolu Pte Ltd, "LightTrac", Apr. 3, 2013, retrieved from https://itunes.apple.com/us/app/lighttrac/id392892355?mt=8, 2 pages
Archived Ecotect Wiki, "SolarTool: Fundamentals" retrieved on Sep. 26, 2013 from http://wiki.naturalfrequency.com/wiki/SolarTool_Fundamentals, 17 pages.

* cited by examiner

TEMPORALLY ADJUSTED APPLICATION WINDOW DROP SHADOWS

FIELD

Embodiments of the present disclosure relate to display of application windows and, more particularly, to temporally adjusted display of application windows.

BACKGROUND

Application windows can be displayed in a graphical user interface (GUI) with various attributes, such as drop shadows. A drop shadow is an element that can be displayed at one or more edges of an application window. The drop shadow can be designed as a visual effect that looks like the shadow of an object. A viewer perceives that the object is raised above the objects behind it. A drop shadow of an object can be drawn as a gray or black area underneath and offset from the object. For example, the drop shadow can be a copy of the object in black or gray that is drawn in a slightly different position. A drop shadow effect can also be achieved by darkening the colors of pixels where a user would expect a shadow to be cast rather than drawing a gray shadow. To produce a more realistic shadow, the edges of the shadow can be softened, for example, by adding a blur, such as a Gaussian blur, to the shadow.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Figure 1:
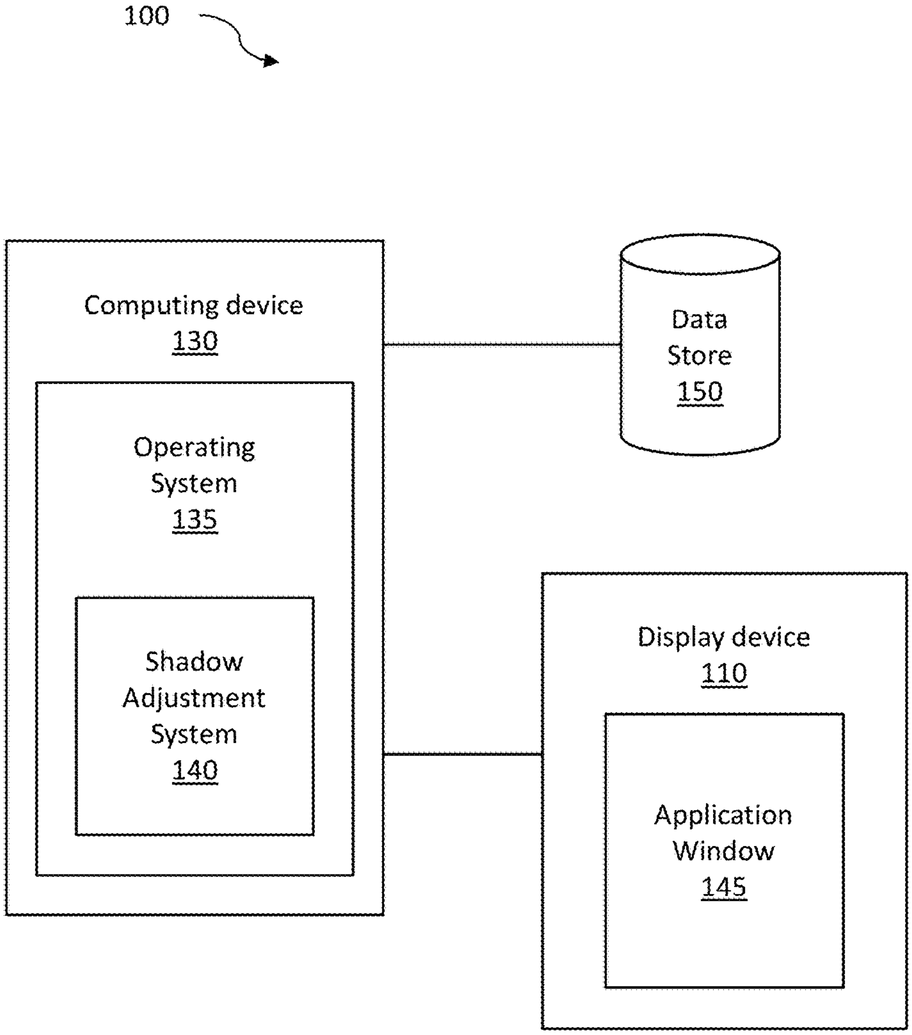
FIG. 1 illustrates exemplary system architecture, in accordance with various embodiments of the present disclosure.

Embodiments of the disclosure are directed to a method and system for temporally adjusting an application window drop shadow. A local time of day for a user device with a display is determined, a value of a visual aspect of a drop shadow associated with an application window on the display is determined. The value of the visual aspect of the drop shadow is based on the local time of day. The drop shadow is displayed based on the value, where the drop shadow is adjacent at least one edge of the application window to provide a visual appearance that the application window is above a background. A new value of the visual aspect of the drop shadow is determined based on a later local time. The drop shadow is then displayed based on the new value of the visual aspect such that the drop shadow has a different visual appearance from the earlier local time to the later local time.

In one example, the visual aspect can be an angle of the drop shadow with respect to the application window, and the angle can shift from a first angle at a first local time to a second angle at a second local time. In another example, the visual aspect can be a position of the drop shadow with respect to the application window, and the position of the drop shadow can shift from a first position at a first local time to a second position at a second local time. For example, the first position can be on a first side of the application window and the second position can be on a second side of the application window opposite the first side.

Computer users can sometimes spend long periods of time looking at a computer monitor or display. Further, some people who use computers during the course of their jobs look at computer displays for the majority of their day, and some of these people work in environments without any views to the outside or windows. Hours can pass without any external environmental clues of the passage of time. When users are particularly focused on the tasks that they are performing on the computer, they may feel disconnected from their environment.

Humans have long marked the passage of time during the day by the movement of the sun across the sky. The movement of the sun provides cues regarding when to conduct the activities of daily life, such as when to wake up, when to eat, when to rest, when to return home, and when to sleep. For centuries, sundials have provided a more accurate measure of time than merely glancing into the wide open sky and attempting to gauge the position of the sun. With sundials, relative times can be more accurately determined because a shadow of a gnomon of the sundial is cast onto a dial face of the sundial. The dial face can be marked such that the edge of the shadow of the gnomon aligns with a marking indicating a certain hour when that hour occurs. As the sun moves through the sky with the passage of time, the shadow of the gnomon moves on the dial face. As the shadow of the gnomon moves, viewers can perceive the passage of time by merely observing the sundial without have to peer at the sun.

According to embodiments, users can have sundial-like or solar-like cues appear on their computer monitors or displays. For example, the drop shadows of application windows that are displayed on a computer display can shift with respect to the application window with the passage of time. In an example, a drop shadow of an application window can be displayed on one side, e.g., the right side, of the application window in the morning, and on the opposite side, e.g., the left side, in the afternoon. The drop shadow can move smoothly from one side of the application window to the other side of the application window throughout the day, with the drop shadow appearing to be straight down, or directly below the application window at noon (or midday). The movement of the drop shadow would be slow enough such that it would not distract the user from the contents of the application window on which the user is doing work. However, the user might subliminally (or subconsciously) perceive that the shadow is moving throughout the day. In an embodiment, the drop shadow may be drawn prominently enough that the user could determine a rough estimate of the time of day by focusing on the drop shadow. As a result of the subtle cue regarding the passage of time perceived by the user, the user can feel more connected with the external environment and the natural rhythms of daily life.

FIG. 1 shows a block diagram of a system architecture 100 according to an embodiment. In an embodiment, a computing device 130 is a user device, such as a personal computer, a laptop computer, a cellular telephone, a personal digital assistant (PDA), etc., that includes an operating system 135 having a shadow adjustment system 140 for temporally adjusting a drop shadow of an application window 145 of an application displayed on a user device 110. The computing device 130 may be part of an organization's network. The computing device 130 may have a display device 110 and a storage device storing a data store 150 which may all reside on the same physical machine. Alternatively, the display device 110 and/or the storage device may be remote devices coupled to the computing device 130 via a network, which may be may be a private network (e.g., a local area network (LAN), a wide area network (WAN), intranet, or other similar private networks) or a public network (e.g., the Internet). The remote display device 110 can be a remote monitor, a remote terminal, a remote desktop or any similar user device.

The shadow adjustment system 140 can be a module of the operating system (OS) 135. According to an embodiment, the shadow adjustment system 140 can display a drop shadow for one or more applications 145 displayed on a display device 110 based on a local time of day. Further, the shadow adjustment system 140 can modify the drop shadow (i.e., modify the appearance of the drop shadow with respect to the application window) throughout the day based on the passage of time. For example, the shadow adjustment system 140 can modify a position, intensity, or an angle of a drop shadow. The shadow adjustment system 140 can also adjust a blur (e.g., a Gaussian blur) of the drop shadow based on the time of day.

The data store 150 includes information regarding how the drop shadow should appear at each particular time throughout the day. For example, the data store 150 can include information about the position of the drop shadow at each particular time throughout the day, information about the angle of the drop shadow at each particular time throughout the day, and/or information about the intensity or blur of the drop shadow at each particular time throughout the day.

The display device 110 can present one or more application windows 145. As the user views the application window 145, the user also views the drop shadow associated with the application window 145. Throughout the period in which the user is using the display device 110, the user can perceive a movement of the drop shadow of the displayed application window 145. By viewing the position of the drop shadow of the displayed application window 145, the user will receive cues as to the time of day. By viewing the perceived movement of the drop shadow, the user will perceive the passage of time. As a result, the user may feel more connected to the user's external environment and have a greater sense of the natural rhythms of the day.

Figure 2:
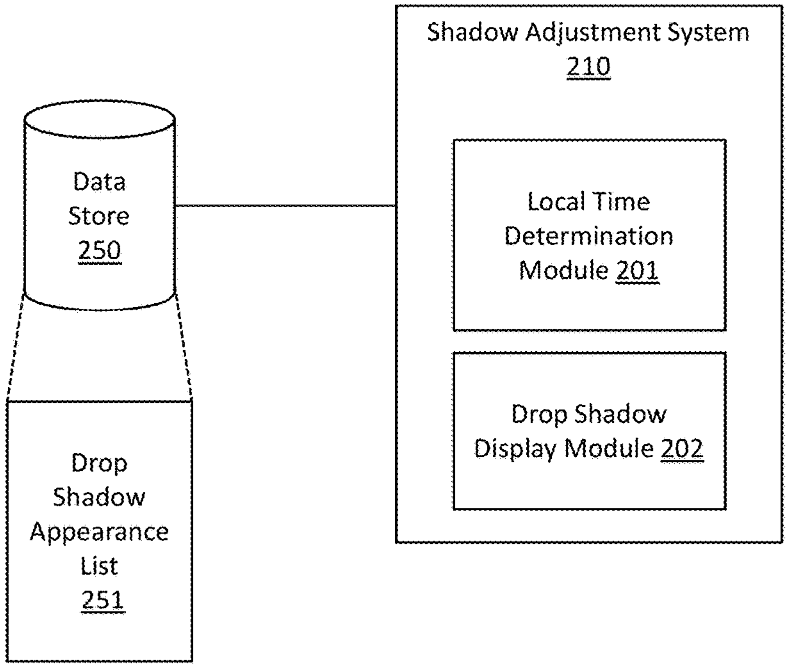
FIG. 2 illustrates a block diagram of an embodiment of a shadow adjustment system and a data store.

FIG. 2 illustrates a shadow adjustment system 210 and a data store 250 according to one embodiment. Here, the shadow adjustment system 210 can be the same as the shadow adjustment system 140 of FIG. 1, and the data store 250 can be the same as the data store 150 of FIG. 1. The shadow adjustment system 210 includes a local time determination module 201 and a drop shadow display module 203. Note that in alternative embodiments, the shadow adjustment system 210 may include more or less modules than those shown in FIG. 2. Also, the local time determination module 201 and drop shadow display module 203 may be combined into a single module. Additionally, the functionality of either the local time determination module 201 or the drop shadow display module 203 may be divided between multiple modules.

In one embodiment, the local time determination module 201 determines the local time of a user device. For example, the local time can be determined based on a clock setting on the user device. In another example, the local time of the user device can be determined based on the time zone in which the user device is located.

Next, the drop shadow display module 202 retrieves drop shadow appearance information from the drop shadow appearance list 251 based on the determined local time. Here, the drop shadow appearance information can include a value of one or more visual aspects of the drop shadow appearance, where the value correlates to the determined local time. For example, the visual aspect can be a drop shadow position with respect to the application window, a drop shadow angle with respect to the application window, a drop shadow intensity, a drop shadow color, a drop shadow blur, or any other suitable appearance related aspect of a drop shadow.

In an embodiment, as the time passes, the drop shadow display module 202 renders the drop shadow in differently (e.g., in different positions with respect to the application window, at different angles with respect to the application window, with different intensities, with different colors, or with different blur), according to the determined local time. In an embodiment, the drop shadow display module 202 moves the drop shadow with respect to the application window as time progresses. In some implementations, the actual movement of the drop shadow would be so slow that the user would not be able to perceive its movement, as one can generally not perceive an hour hand of a clock moving. However, at different times, the position of the drop shadow would appear to be different to the user. In an embodiment, each movement of the drop shadow can be small enough so that the drop shadow is smoothly transitioned from one side of the application window to the other side of the application window.

In an embodiment, the local time determination module 201 determines the local time at certain intervals (e.g., every minute, every quarter hour, every hour, etc.) and the drop shadow display module 202 retrieves drop shadow appearance information from the drop shadow appearance list 251 based on the newly determined local time. The drop shadow display module 202 then renders the drop shadow with respect to the window based on the drop shadow appearance information.

In an example where the aspect is drop shadow position, the drop shadow display module 202 receives a drop shadow position value that correlates to the determined local time. For example, if the local time is determined to be 9 AM, the drop shadow position value can indicate that the drop shadow should be rendered a certain distance (e.g., 2 mm) to the right of the application window. Here, from the user's perspective (assuming that the user is positioned in the usual position for using a computer where the user's head is centered with respect to the monitor), the source of light (i.e., the sun) would appear to be over the left shoulder of the user. If the local time is determined to be 10:30 AM, the drop shadow position value can indicate that the drop shadow should be rendered a different distance (e.g., 1 mm) to the right of the application. Here, from the user's perspective, the source of light would appear to be over the left shoulder of the user, but closer to the user's head that it was at 9 AM. If the local time is determined to be noon, the drop shadow position value can indicate that the drop shadow should be rendered straight down (or directly below) the application window. Here, from the user's perspective, the source of light would appear to be directly above the user's head. If the local time is determined to be 1:30 PM, the drop shadow position value can indicate that the drop shadow should be rendered a certain distance (e.g., 1 mm) to the left of the application. Here, from the user's perspective, the source of light would appear to be over the right shoulder of the user. If the local time is determined to be 3:00 PM, the drop shadow position value can indicate that the drop shadow should be rendered a different distance (e.g., 2 mm) to the left of the application. Here, from the user's perspective, the source of light would appear to be over the right shoulder of the user, but further from the user's head than it was at 1:30 PM.

In an example where the aspect is drop shadow angle, the drop shadow display module 202 receives a drop shadow angle value that correlates to the determined local time. For example, if the local time is determined to be 9 AM, the drop shadow angle value can indicate that the drop shadow should be rendered with a certain angle (e.g., 10 degrees clockwise) with respect to the application window. Here, from the user's perspective, the source of light would appear to be over the left shoulder of the user. If the local time is determined to be 10:30 AM, the drop shadow angle value can indicate that the drop shadow should be rendered with a different angle (e.g., 5 degrees clockwise) with respect to the application window. Here, from the user's perspective, the source of light would appear to be over the left shoulder of the user, but closer to the user's head that it was at 9 AM. If the local time is determined to be noon, the drop shadow angle value can indicate that the drop shadow should be rendered straight down (or directly below) the application window. Here, from the user's perspective, the source of light would appear to be directly above the user's head. If the local time is determined to be 1:30 PM, the drop shadow angle value can indicate that the drop shadow should be rendered with a certain angle (e.g., 5 degrees counterclockwise) with respect to the application window. Here, from the user's perspective, the source of light would appear to be over the right shoulder of the user. If the local time is determined to be 3:00 PM, the drop shadow angle value can indicate that the drop shadow should be rendered with a different angle (e.g., 10 degrees counterclockwise) with respect to the application window. Here, from the user's perspective, the source of light would appear to be over the right shoulder of the user, but further from the user's head than it was at 1:30 PM.

In an embodiment, the source of light appears to move from over the user's right shoulder to over the user's left shoulder as time passes, rather than from over the user's left shoulder to over the user's right shoulder.

In an embodiment, during periods when the sun would not be moving across the sky where the user is located (i.e., after sunset (e.g., about 6 PM) and before sunrise (e.g., about 6 AM), the drop shadow would appear to be in the same position as the drop shadow would appear at noon. In an example, during night time, as at noon, the drop shadow could appear to be straight down from or below the application window, as though the light source were above the user's head.

Figure 3A:
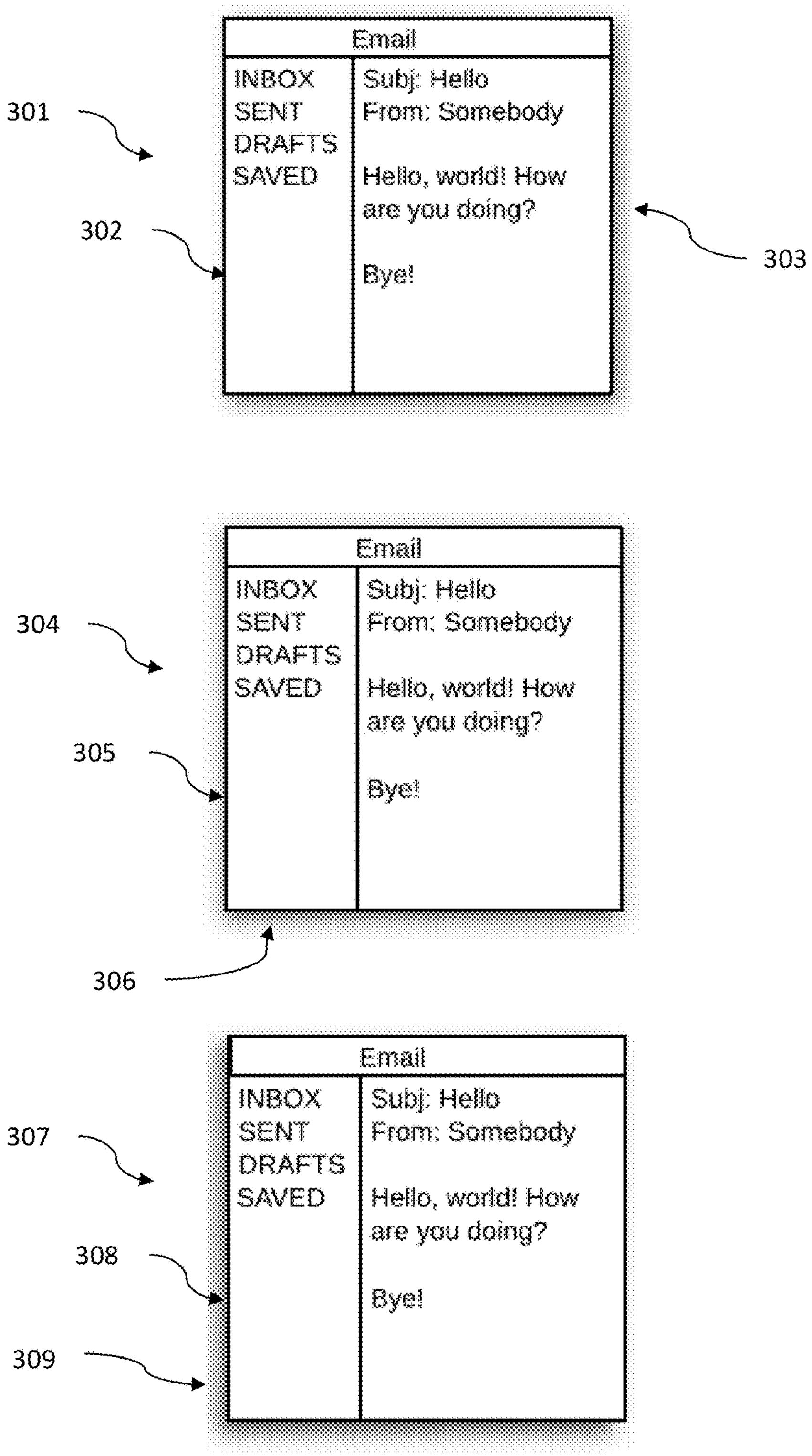
FIG. 3A illustrates screen capture views of windows with blurred shadows at various times according to one embodiment.

FIG. 3A illustrates example screen capture views of windows with blurred drop shadows at various times according to an embodiment. In screen capture 301 showing application window 302 (e.g., an email application), the local time has been determined to be 9 AM. As a result, a shadow adjustment system (e.g., the shadow adjustment system 140 of FIG. 1) renders a blurred drop shadow 303 a certain distance to the right of the application window 302.

In screen capture 304 showing application window 305 (e.g., an email application), the local time has been determined to be 12 PM. As a result, a shadow adjustment system renders a blurred drop shadow 306 to appear below the application window 305.

In screen capture 307 showing application window 308 (e.g., an email application), the local time has been determined to be 4 PM. As a result, a shadow adjustment system renders a blurred drop shadow 309 a certain distance to the left of the application window 308.

Figure 3B:
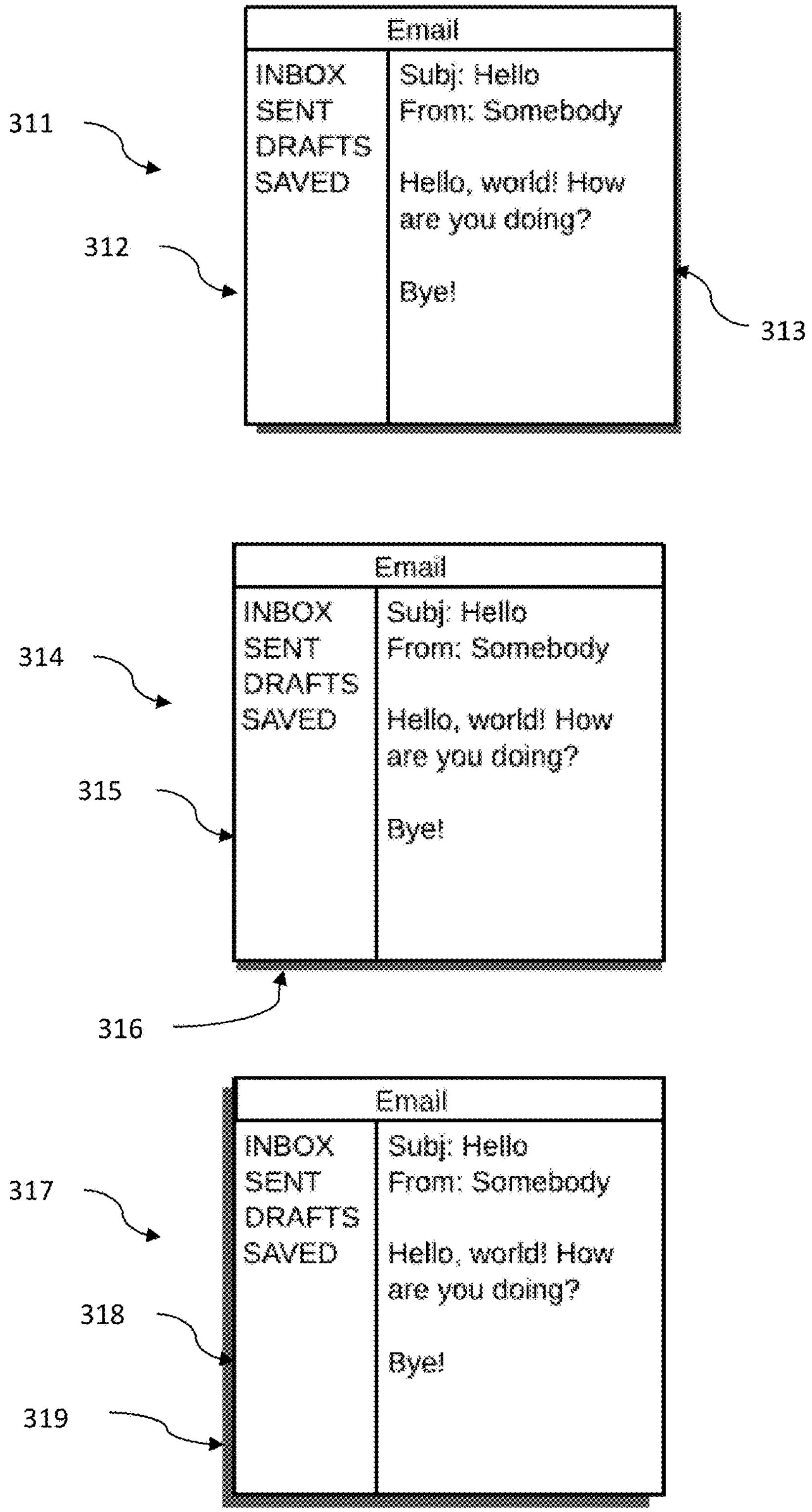
FIG. 3B illustrates screen capture views of windows with flat shadows at various times according to one embodiment.

FIG. 3B illustrates example screen capture views of windows with flat drop shadows at various times according to an embodiment. In screen capture 311 showing application window 312 (e.g., an email application), the local time has been determined to be 9 AM. As a result, a shadow adjustment system renders a flat drop shadow 313 a certain distance to the right of the application window 302.

In screen capture 314 showing application window 315 (e.g., an email application), the local time has been determined to be 12 PM. As a result, a shadow adjustment system renders a flat drop shadow 316 to appear directly below the application window 315.

In screen capture 317 showing application window 318 (e.g., an email application), the local time has been determined to be 4 PM. As a result, a shadow adjustment system renders a flat drop shadow 319 a certain distance to the left of the application window 318.

Figure 3C:
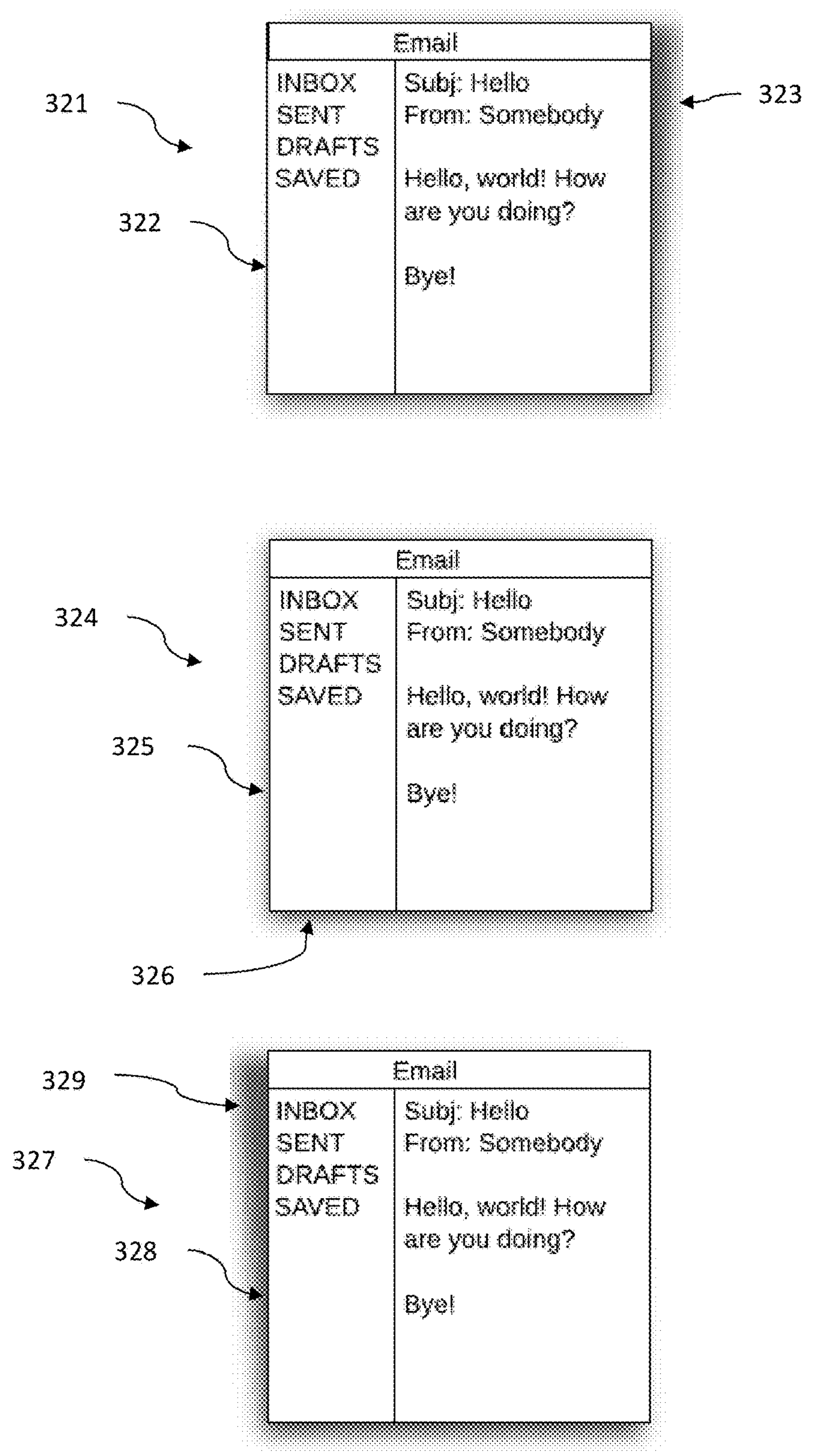
FIG. 3C illustrates screen capture views of windows with angled blurred shadows at various times according to one embodiment.

FIG. 3C illustrates screen capture views of windows with angled blurred drop shadows at various times according to an embodiment. In screen capture 321 showing application window 322 (e.g., an email application), the local time has been determined to be 9 AM. As a result, a shadow adjustment system renders an angled blurred drop shadow 323 at a certain angle to the right of the application window 322.

In screen capture 324 showing application window 325 (e.g., an email application), the local time has been determined to be 12 PM. As a result, a shadow adjustment system renders an angled blurred drop shadow 326 to appear directly below the application window 325.

In screen capture 327 showing application window 328 (e.g., an email application), the local time has been determined to be 4 PM. As a result, a shadow adjustment system renders an angled blurred drop shadow 329 at a certain angle to the left of the application window 328.

Figure 3D:
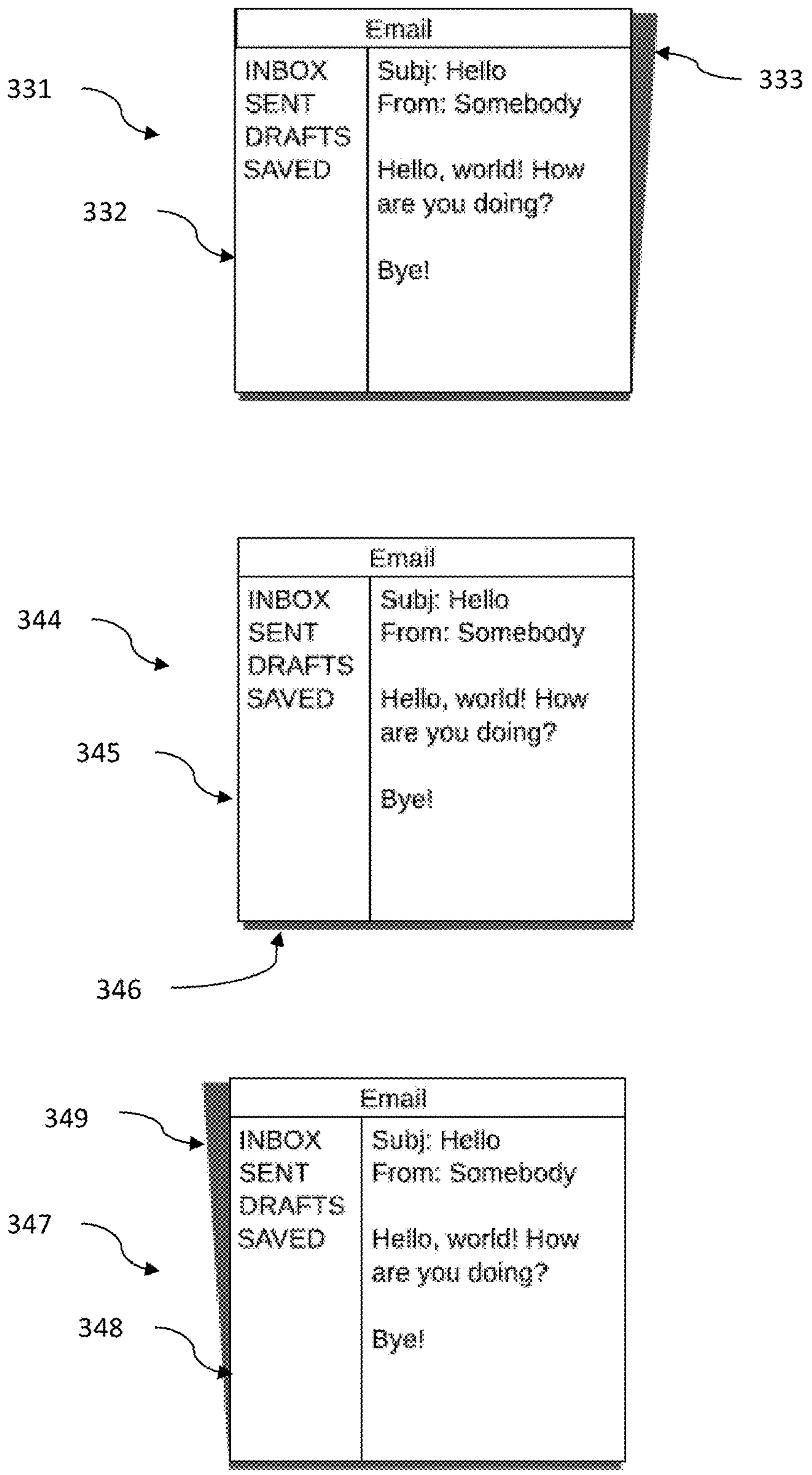
FIG. 3D illustrates screen capture views of windows with angled flat shadows at various times according to one embodiment.

FIG. 3D illustrates screen capture views of windows with angled flat drop shadows at various times according to one embodiment. In screen capture 331 showing application window 332 (e.g., an email application), the local time has been determined to be 9 AM. As a result, a shadow adjustment system renders an angled flat drop shadow 333 at a certain angle to the right of the application window 332.

In screen capture 334 showing application window 335 (e.g., an email application), the local time has been determined to be 12 PM. As a result, a shadow adjustment system renders an angled flat drop shadow 336 to appear directly below the application window 335.

In screen capture 337 showing application window 338 (e.g., an email application), the local time has been determined to be 4 PM. As a result, a shadow adjustment system renders an angled flat drop shadow 339 at a certain angle to the left of the application window 338.

Figure 4:
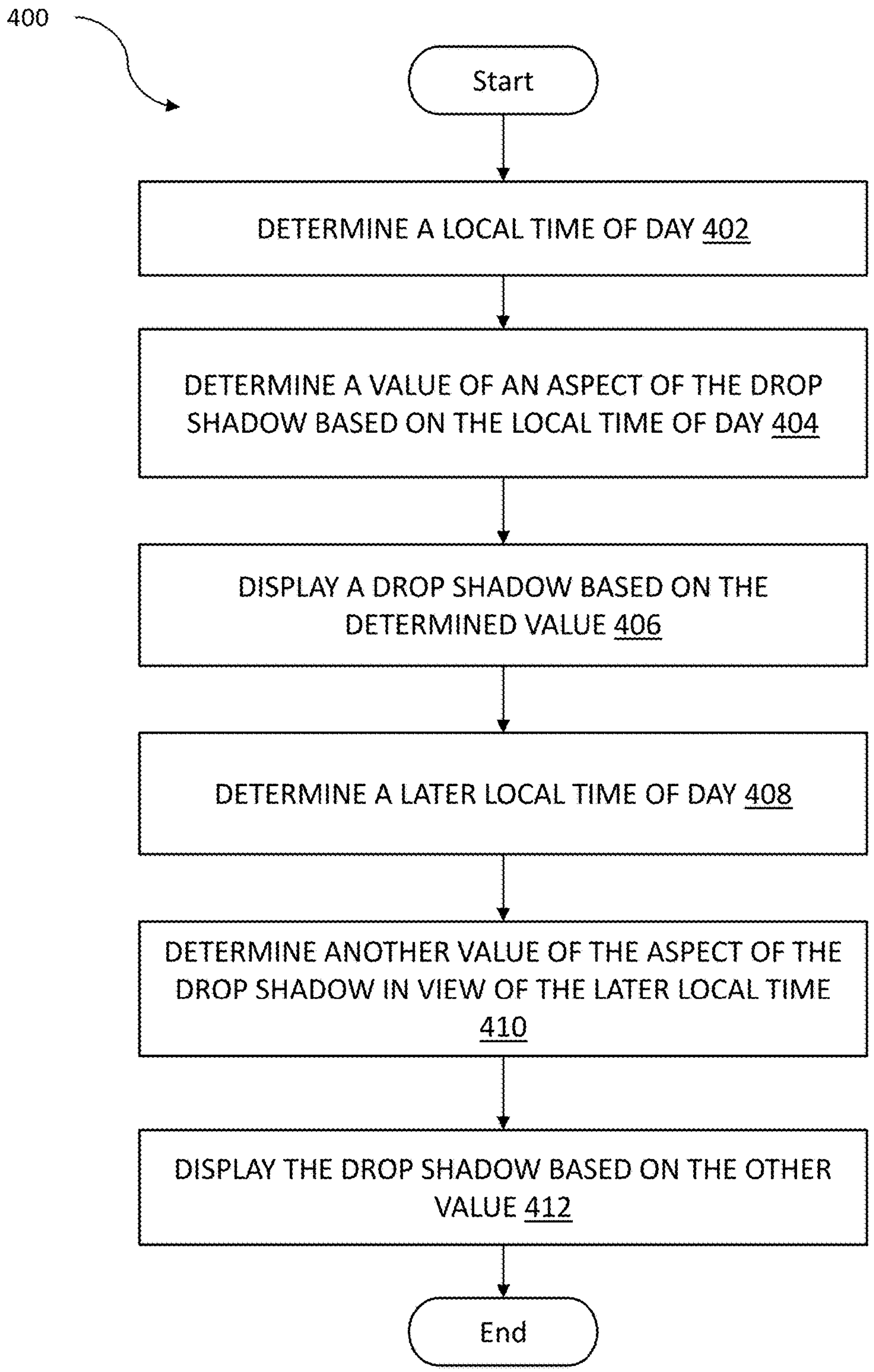
FIG. 4 illustrates a flow diagram of a method of temporally adjusting application window drop shadows according to one embodiment.

FIG. 4 illustrates a method 400 of temporally adjusting application window drop shadows according to an embodiment. The method 400 is performed by processing logic that may comprise hardware (circuitry, dedicated logic, etc.), software (such as is run on a general purpose computer system or a dedicated machine), or a combination of both. In one embodiment, the method 300 is performed by the shadow adjustment system 210 of FIG. 2.

At block 402, a local time of day for a user device is determined. For example, the local time of day can be determined based on the clock setting on the user device or based on a time zone of a determined location of the device. The location of the device can be determined by a global positioning system (GPS) or by an IP address of the user device.

At block 404, a value of a visual aspect of a drop shadow is determined based on the local time of day. The value is correlated to the local time of day. For example, the value of the aspect is different at one local time of day from another. In an embodiment, the aspect could be a drop shadow position, a drop shadow angle, or another visual aspect of a drop shadow.

At block 406, a drop shadow associated with a window application is displayed, based on the value of the aspect. The drop shadow is adjacent to one or more edges of the application window to provide a visual impression that the window is in a plane above a background.

At block 408, a later local time of day is determined. At block 410 another value of the aspect is determined based on the later local time.

At block 412, the drop shadow is displayed based on the other value of the aspect. The drop shadow displayed at the later local time is different from the earlier local time. As the corresponding value of the aspect changes with the passage of time, the rendering of the drop shadow with respect to the application window will change. In the example where the aspect is position, the position where the drop shadow is displayed with respect to the application window moves as time passes.

Figure 5:
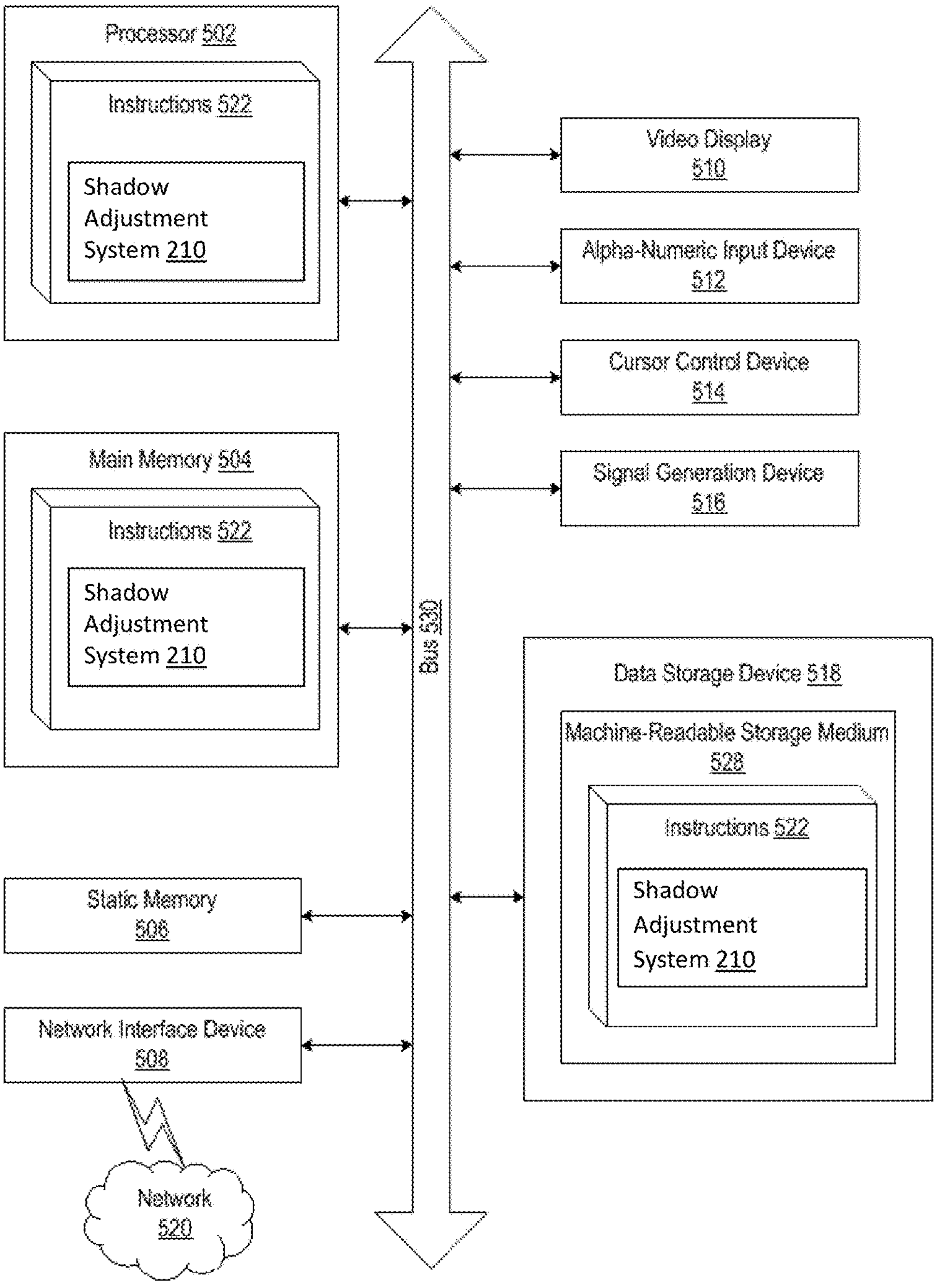
FIG. 5 illustrates a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a shadow adjustment system (e.g., shadow adjustment system 210 of FIG. 2). While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “identifying”, “determining”, “configuring”, “searching”, “sending,” “receiving,” “requesting,” “providing,” “generating,” “adding,” or the like, refer to the actions and processes of a computer system, or similar electronic computing device, that manipulates and transforms data represented as physical (e.g., electronic) quantities within the computer system’s registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

determining, by a processing device, a first local time of day for a user device with a display;

determining, by the processing device, a first value of a visual aspect of a drop shadow associated with an application window on the display, wherein the first value of the visual aspect of the drop shadow correlates to the first local time of day of a direction of a source of light and a first degree of a clockwise angle of the drop shadow with respect to the application window;

determining, by the processing device using the first value, a first set of drop shadow adjustment values comprising a first intensity level and a first distance for displaying the drop shadow from the application window;

displaying, by the processing device, the drop shadow on the display with respect to the application window in view of the first set of drop shadow adjustment values, wherein the drop shadow is adjacent to at least one edge of the application window to provide a visual appearance that the application window is above a background, wherein the drop shadow is presented on the display at an angle with respect to the at least one edge, wherein the angle indicates the first local time of day;

determining, by the processing device, a second local time of day for the user device;

determining, by the processing device, a second value of the visual aspect of the drop shadow, wherein the second value correlates to the second local time of the direction of the source of light and a second degree of the clockwise angle of the drop shadow with respect to the application window;

determining, by the processing device using the second value, a second set of drop shadow adjustment values comprising a second intensity level and a second distance for displaying the drop shadow from the application window; and adjusting, by the processing device, the drop shadow on the display to rotate to the second degree of the clockwise angle with respect to the application window in view of the second set of drop shadow adjustment values, wherein the drop shadow comprises a different visual appearance from the first local time to the second local time in view of the second intensity level and the second distance.

2. The method of claim 1, wherein the visual aspect is a position of the drop shadow with respect to the application window.

3. The method of claim 2, wherein the position of the drop shadow is a first position at the first local time and a second position at the second local time.

4. The method of claim 3, wherein the first position is on a first side of the application window and the second position is on a second side of the application window opposite the first side.

5. The method of claim 1, wherein the drop shadow provides a cue regarding time to a user.

6. A system comprising:

a memory; and a processing device operatively coupled to the memory to:

determine a first local time of day for a user device with a display;

determine a first value of a visual aspect of a drop shadow associated with an application window on the display, wherein the first value of the visual aspect of the drop shadow correlates to a direction of a source of light at the first local time of day and a first degree of a clockwise angle for the drop shadow with respect to the application window;

determine, using the first value, a first set of drop shadow adjustment values comprising a first intensity level and a first distance for displaying the drop shadow from the application window;

display the drop shadow on the display with respect to the application window in view of the first set of drop shadow adjustment values, wherein the drop shadow is adjacent to at least one edge of the application window to provide a visual appearance that the application window is above a background, wherein the drop shadow is presented on the display at an angle with respect to the at least one edge, wherein the angle indicates the first local time of day;

determine a second local time of day for the user device;

determine a second value of the visual aspect of the drop shadow, wherein the second value correlates to the direction of the source of light at the second local time and a second degree of the clockwise angle of the drop shadow with respect to the application window;

determine, using the second value, a second set of drop shadow adjustment values comprising a second intensity level and a second distance for displaying the drop shadow from the application window; and adjust the drop shadow on the display to rotate to the second degree of the clockwise angle with respect to the application window in view of the second set of drop shadow adjustment values, wherein the drop shadow comprises a different visual appearance from the first local time to the second local time in view of the second intensity level and the second distance.

7. The system of claim 6, wherein the visual aspect is a position of the drop shadow with respect to the application window.

8. The system of claim 7, wherein the position of the drop shadow is a first position at the first local time and a second position at the second local time.

9. The system of claim 7, wherein the first position is on a first side of the application window and the second position is on a second side of the application window opposite the first side.

10. The system of claim 6, wherein the drop shadow provides a cue regarding time to a user.

11. A non-transitory computer-readable storage medium including instructions that, when executed by a processing device, cause the processing device to:

determine a first local time of day for a user device with a display;

determine, by the processing device, a first value of a visual aspect of a drop shadow associated with an application window on the display, wherein the first value of the visual aspect of the drop shadow correlates to a direction of a source of light at the first local time of day and a first degree of a clockwise angle for the drop shadow with respect to the application window;

determine, using the first value, a first set of drop shadow adjustment values comprising a first intensity level and a first distance for displaying the drop shadow from the application window;

display the drop shadow on the display with respect to the application window in view of the first set of drop shadow adjustment values, wherein the drop shadow is adjacent to at least one edge of the application window to provide a visual appearance that the application window is above a background, wherein the drop shadow is presented on the display at an angle with respect to the at least one edge, wherein the angle indicates the first local time of day;

determine a second local time of day for the user device;

determine a second value of the visual aspect of the drop shadow, wherein the second value correlates to the direction of the source of light at the second local time and a second degree of the clockwise angle of the drop shadow with respect to the application window;

determine, using the second value, a second set of drop shadow adjustment values comprising a second intensity level and a second distance for displaying the drop shadow from the application window; and adjust the drop shadow on the display to rotate to the second degree of the clockwise angle with respect to the application window in view of the second set of drop shadow adjustment values, wherein the drop shadow comprises a different visual appearance from the first local time to the second local time in view of the second intensity level and the second distance.

12. The non-transitory computer-readable storage medium of claim 11, wherein the visual aspect is a position of the drop shadow with respect to the application window.

13. The non-transitory computer-readable storage medium of claim 12, wherein the position of the drop shadow is a first position at the first local time and a second position at the second local time.

14. The non-transitory computer-readable storage medium of claim 12, wherein the first position is on a first side of the application window and the second position is on a second side of the application window opposite the first side.

* * * * *